US008726954B2

(12) United States Patent
Simmons

(10) Patent No.: US 8,726,954 B2
(45) Date of Patent: May 20, 2014

(54) CONDENSOR COIL WIND GUARD AND METHOD OF ASSEMBLY

(76) Inventor: Randy Simmons, West Chester, OH (US)

(*) Notice: Subject to any disclaimer, the term of this patent is extended or adjusted under 35 U.S.C. 154(b) by 536 days.

(21) Appl. No.: 12/913,446

(22) Filed: Oct. 27, 2010

(65) Prior Publication Data

US 2012/0103482 A1 May 3, 2012

(51) Int. Cl.
*A47F 3/04* (2006.01)

(52) U.S. Cl.
USPC ........... 150/165; 150/154; 114/361; 165/119; 165/122; 256/25; 256/27; 55/385; 55/471; 55/480; 55/491; 62/249; 62/255; 62/256; 62/507

(58) Field of Classification Search
USPC ............... 150/154, 165; 55/495, 354, 351; 206/204; 62/249, 255; 160/329
See application file for complete search history.

(56) References Cited

U.S. PATENT DOCUMENTS

| | | | |
|---|---|---|---|
| 1,851,901 A * | 3/1932 | Gran | 62/263 |
| 4,027,498 A | 6/1977 | Fessler | |
| 4,328,676 A | 5/1982 | Reed | |
| 4,392,360 A * | 7/1983 | Gidge et al. | 62/249 |
| 4,412,791 A | 11/1983 | Lal | |
| 4,429,548 A * | 2/1984 | Layne | 62/255 |
| 4,465,499 A | 8/1984 | Wawro et al. | |
| 4,745,769 A | 5/1988 | Wooden, Jr. | |
| 4,807,444 A | 2/1989 | Aoki et al. | |
| 4,926,081 A | 5/1990 | DiFlora et al. | |
| 4,991,406 A | 2/1991 | Fujii et al. | |
| 5,131,463 A * | 7/1992 | Zimmerli et al. | 165/119 |
| 5,141,046 A | 8/1992 | Duncan | |
| 5,156,662 A * | 10/1992 | Downing et al. | 55/493 |
| 5,370,722 A | 12/1994 | Simmons | |
| 5,399,180 A | 3/1995 | Kopp | |
| 5,532,663 A | 7/1996 | Herd et al. | |
| 5,809,800 A | 9/1998 | Deal | |
| 5,915,283 A | 6/1999 | Reed et al. | |
| 5,964,910 A | 10/1999 | Keele | |
| 6,138,993 A * | 10/2000 | Mitchell et al. | 256/25 |
| 6,197,077 B1 | 3/2001 | Simmons et al. | |
| 6,264,713 B1 | 7/2001 | Lewis, II | |
| 6,279,335 B1 * | 8/2001 | Jacobs | 62/249 |
| 6,334,881 B1 | 1/2002 | Giannetta et al. | |
| 6,406,508 B1 | 6/2002 | Bloomer | |
| 6,430,954 B1 | 8/2002 | Smith | |
| 6,623,540 B2 | 9/2003 | Clayton et al. | |
| 6,796,359 B1 * | 9/2004 | Knutson | 160/156 |
| 6,912,766 B2 | 7/2005 | Wendt et al. | |

(Continued)

OTHER PUBLICATIONS

International Search Report, PCT/US2012/065314—Dated May 15, 2013, 6 pages.

*Primary Examiner* — Fenn Mathew
*Assistant Examiner* — Cynthia Collado
(74) *Attorney, Agent, or Firm* — Gifford, Krass, Sprinkle, Anderson & Citkowski, P.C.

(57) ABSTRACT

A covering for use with an outdoor located unit defining an opening which exhibits a plurality of cold temperature sensitive components such as heat dissipating coils or cooling tower coils. A plurality of fasteners are secured to a face of the unit at locations proximate to at least one surrounding side of the opening. The fasteners secure to perimeter extending locations associated with an impermeable layer of material arranged over the opening in order to prevent air movement, ice, and snow through said opening in contact with the coils.

15 Claims, 6 Drawing Sheets

(56) References Cited

U.S. PATENT DOCUMENTS

| | | |
|---|---|---|
| 6,918,940 B1 | 7/2005 | Lackey et al. |
| 6,974,622 B2 | 12/2005 | Wade |
| 6,993,927 B2 | 2/2006 | Austen et al. |
| 7,043,935 B2 | 5/2006 | Hunter |
| 7,323,028 B2 | 1/2008 | Simmons |
| 7,387,654 B1 * | 6/2008 | Byers .......................... 55/385.1 |
| 7,416,577 B2 | 8/2008 | Simmons |
| 7,604,127 B2 | 10/2009 | Freissle et al. |
| 7,842,116 B2 | 11/2010 | Simmons |
| 7,896,941 B2 | 3/2011 | Choi |
| 2005/0098080 A1 * | 5/2005 | Pritchett ....................... 114/361 |
| 2005/0279063 A1 * | 12/2005 | Simmons ........................ 55/495 |
| 2005/0279064 A1 * | 12/2005 | Simmons ........................ 55/495 |
| 2005/0279065 A1 * | 12/2005 | Simmons ........................ 55/495 |
| 2007/0204945 A1 * | 9/2007 | Ross ............................. 150/165 |
| 2009/0014371 A1 | 1/2009 | Cook |

* cited by examiner

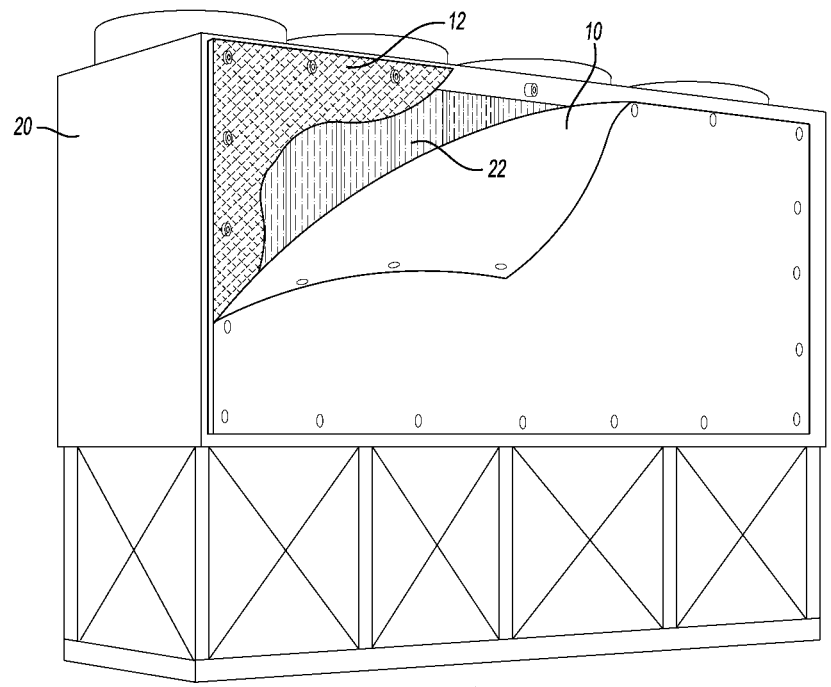
Fig-1
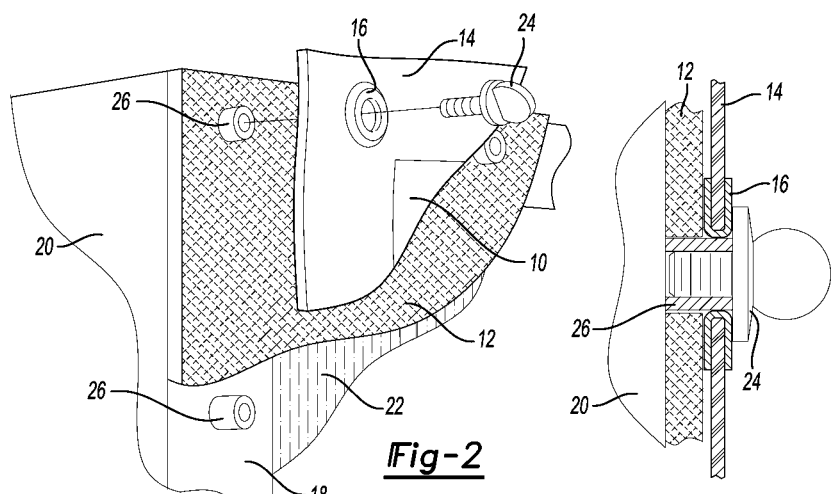
Fig-2
Fig-3

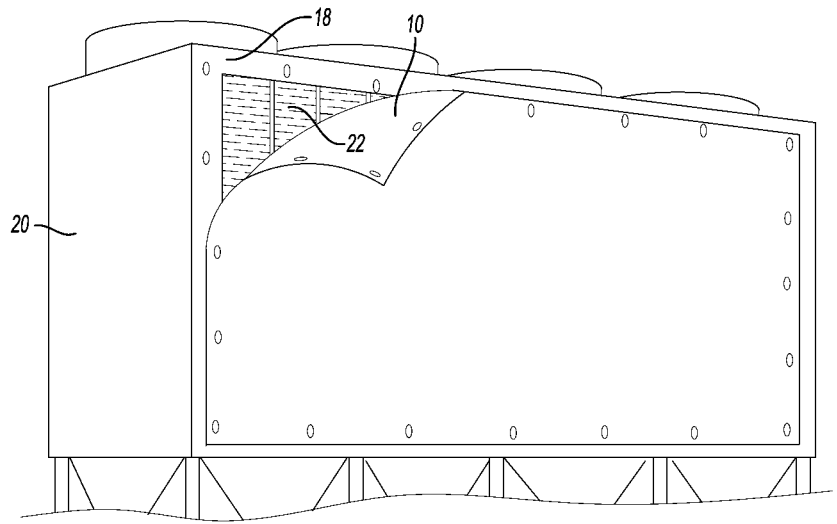
Fig-4
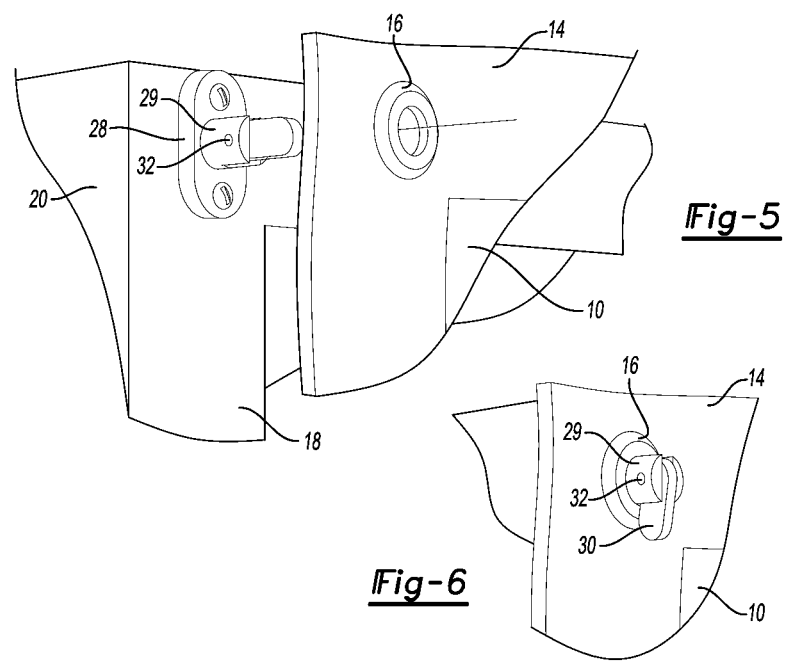
Fig-5
Fig-6

US 8,726,954 B2

CONDENSOR COIL WIND GUARD AND METHOD OF ASSEMBLY

FIELD OF THE INVENTION

The present invention relates generally to a protective air impermeable covering for use during such applications as cold starting of air cooled condensers and chillers, as well as separately for use on cooling towers for protecting its internal components from damage by ice and snow during winter shutdown. In one application, the covering is applied over an opening revealing heat dissipating coils of an associated compressor, and in order to prevent air movement through the condenser coils to ensure a minimum required temperature of the compressor necessary for cold starting. Preventing airflow directly through the coil at low ambient temperatures enables the condenser or chiller to retain the necessary heat for startup as well as to operate normally at low ambient temperatures. The impermeable cover is removable upon temperatures rising in the condenser or chiller to the point that it can no longer reject enough heat for normal operation.

BACKGROUND OF THE INVENTION

The prior art is documented with examples of filter screen coverings and assemblies for use with air intake openings. These include such as described in U.S. Patent Application Publication No. 2005/0279063 and issued U.S. Pat. Nos. 7,323,028 and 7,416,577, all to Simmons, each of which discloses a mesh filtering element maintained in close proximity to an intake opening and for preventing the admittance of contaminants and the like. Traditional methods for preventing air from blowing through exposed chiller coils also includes placement of plywood over the coils, placing plastic tarps over the associated unit, as well as building brick or concrete barriers around the condenser or chiller unit.

SUMMARY OF THE INVENTION

A protective air impermeable covering for use during cold starting of air cooled condensers and chillers as well as for protecting the internal components of cooling towers from ice and snow during winter shutdown. The covering includes a heavy duty and fiber reinforced vinyl material with reinforced outer binding and which is applied over an opening revealing heat dissipating coils of an associated condenser or chiller unit, in order to prevent air movement through the associated and heat dissipating coils, thereby ensuring a minimum required temperature of the compressor necessary for cold starting by preventing airflow directly through the coil at low ambient temperatures enabling the condenser or chiller to retain the necessary heat for startup as well as to operate normally at low ambient temperatures. Similar attachment is also contemplated for securing over a cooling tower during winter shutdown.

A variety of fastener combinations are provided for securing the impermeable and environmental protective covering over the coil exposing opening, these including each of thumb screws (with or without surface mounted stud fasteners), variations of twist and lock fasteners, perimeter surrounding and spring biased clamp fasteners, extending support cables, and curtain supporting structures. The impermeable cover is removable upon temperatures rising in the condenser or chiller to the point that it can no longer reject enough heat for normal operation, such as typically occurring during warmer seasons during which the cover can be stored. In a further application, the cover is removable from a cooling tower opening during such as spring startup and after the threat of ice and snow has passed.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an environmental perspective of the covering assembly according to a first embodiment in which the outer impermeable covering is temporarily assembled over an inner filtering layer and to a mounting surface surrounding an opening accessible to a plurality of heat dissipating coils of a chiller or condenser unit;

FIG. 2 is an enlarged exploded and partial illustration of a corner of the unit illustrated in FIG. 1 and in which a first variant of thumb screw fastener with associated and surface mounted stud adaptor is provided for securing the outer impermeable layer and inner filtering layer over the unit opening;

FIG. 3 is a side assembled and cutaway view of the fastener arrangement illustrated in FIG. 2 and illustrating the manner in which the thumb screw and stud adapter is dimensioned for receiving the outer impermeable layer in overlapping and sandwiching fashion relative to the inner disposed filtering layer;

FIG. 4 is an illustration similar to FIG. 1 of the air impermeable covering according to a further embodiment in which the impermeable covering is directly secured to the unit without provision of an intermediate filtering layer;

FIG. 5 is an enlarged and exploded partial illustration of a corner of the unit illustrated in FIG. 4 and illustrating a rotating and support fastener according to a further embodiment which is dimensioned for securing and supporting the single layer thickness associated with the attachable layer with perimeter reinforced eyelet;

FIG. 6 is an assembled view of the fastener and impermeable layer illustrated in FIG. 5;

DETAILED DESCRIPTION OF THE PREFERRED EMBODIMENTS

Figure 7:
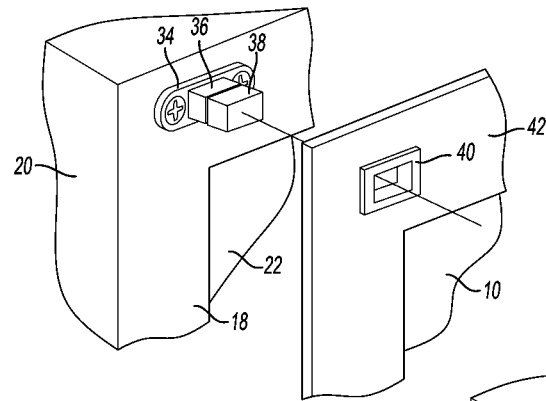
FIG. 7 is a partial exploded illustration of a rotate and lock fastener according to a further variant for mounting an impermeable layer exhibiting a perimeter extending and stiffening frame.

The present invention discloses an air impermeable covering for use during winter months or other cold seasons, such as in one application to assist in cold starting of air cooled condensers and chillers. As previously described, the covering is applied over an opening revealing any cold temperature sensitive internal components such as heat dissipating coils associated with a compressor, and in order to prevent air movement through the condenser coils to ensure a minimum required temperature of the compressor necessary for cold starting. The present invention is equally applicable to covering a cooling tower opening during winter shutdown and to protect from ice and snow damage to its internal components which can also be adversely affected (damaged) by such as ice and snow.

In the initially referenced embodiment, the ability to preventing airflow directly through the heat dissipating coils, while counter intuitive, is desirable at low ambient temperatures to enable the condenser (or chiller) to retain the necessary heat for accomplishing startup, as well as to operate normally. The impermeable cover is removable upon temperatures rising in the condenser or chiller, such as to the point where the unit can no longer reject enough heat for normal operation with the impermeable covering remaining in place.

As will be further described in detail in the several embodiments, the impermeable covering, as illustrated at 10 in each of FIGS. 1 and 4, can be provided exclusively or (in reference only to FIG. 1) in combination with an underlying filtration screen 12 (such as further including but not limited to any type of closed or open loop mesh design including cottonwood filtration suitable for filtering out particulates and contaminants of any desired size or dimension). The impermeable layer 10 is illustrated in one possible variant in each of FIGS. 1-6 and can include a heavy duty, fiber reinforced vinyl with integrally formed and flexible reinforced outer binding (e.g. hem or binding materials generally referenced at 14).

Also illustrated are a plurality of perimeter spaced eyelets 16 (also termed grommets) according to one configuration and which mount to the reinforced outer hem or binding 14 in order to define inner apertures through which are received appropriately sized fasteners in order facilitate mounting to a perimeter extending surface 18 of a condenser or chiller unit 20 (such also understood to include cooling towers as previously described), such as revealing an interior 22 supporting a plurality of heat dissipating elements. The aspects of the unit 20 will not be described in any detail beyond the general indication that they are associated with any manner of heat dissipating structure or again cooling tower, such as which includes appropriately configured coils or the like in order to throw off or otherwise vent to the ambient heat generated by the powering of the assembly (such as again associated with a condenser or chiller unit).

FIGS. 2 and 3 illustrate respectively enlarged exploded and side assembly and cutaway views of a partial illustration of a corner of the unit 20 such as illustrated in FIG. 1, and in which a first variant of thumb screw fastener 24 with associated and surface mounted stud adaptors 26 are provided for securing the outer impermeable layer 10 and inner filtering layer 12 over the unit opening 22. As shown, the thumb screw fasteners 24 are threadably mounted to associated stud adapters 26, these in turn being either fixedly or otherwise mounted in projecting fashion from the mounting surface 18 of the unit 20 in perimeter extending proximity to the opening 22.

The stud adapters 26, in one desired configuration, exhibit interior threads for receiving the thumb screws in rotatably engaged fashion (see as further shown in FIG. 3). It is further understood that then thumb screw and stud adapter may be dimensioned (such as by lengthening) in order to receive the outer impermeable layer 10 in overlapping and sandwiching fashion relative to the inner disposed filtering layer 12. Alternatively, the length dimensions of the surface mounted studs 26 and thumb screws 24 (or any other surface mounting fastener configuration including those illustrated herein) can be modified (i.e. lengthened or shortened) as required to adjust to varying thicknesses of outer layer 10 and optional inner mesh layer 12.

As previously stated, FIG. 4 is an illustration similar to FIG. 1 of the air impermeable covering 10 according to a further embodiment, and in which the impermeable covering 10 is directly secured to the unit 20 without provision of an intermediate filtering layer 12 shown in FIG. 1. The air impermeable covering 10, as will be further illustrated throughout the several succeeding embodiments, can further exhibit any desired configuration and thickness.

Referring now to FIG. 5, an enlarged and exploded partial illustration is shown of a corner of the unit 20 illustrated in FIG. 4 incorporating a rotating and support fastener including a base portion 28 which can be mounted with (but not limited to) screws engaging within the surface 18 of the unit. A supporting structure 29 which extends outwardly a projected distance from the base portion 28 and upon which is supported the embedded eyelets 16 associated with the impermeable covering 10. A generally elongate and rounded edged rotatable component 30 is provided and which is mounted, such as by a pin, about an axis 32 in seating fashion within an exposed slot defined in the supporting structure 29. In this fashion, the rotatable component 30 is pivoted from a first linear extending position illustrated in FIG. 5 to an assembled and retaining position as further shown in FIG. 6 in which the impermeable layer 10 is restrained via the eyelet 16 seated over the supporting structural portion 29.

FIG. 7 is a partial exploded illustration of a rotate and lock fastener according to a further variant for mounting an impermeable layer exhibiting a perimeter extending and stiffening frame. The fasteners, in contrast to those depicted in FIG. 4, include a mounted base portion 34, as a structurally extending and rectangular configured supporting portion 36 and an end mounted, biased and rotatable portion 38 which is also rectangular configured.

The impermeable layer 10 includes a plurality of perimeter extending and aligning eyelets 40 (as opposed to the circular eyelet shape 16 previously illustrated), each eyelet 40 exhibiting a rectangular configuration surrounding an inner defined aperture dimensioned for being received over the respective rectangular configuration associated with the supporting portion 36 and aligned rotatable portion 38 as depicted in FIG. 7. A perimeter extending and stiffened frame portion 42 is established with the impermeable layer 10 (as opposed to the flexible and integrally formed reinforcing hem portion 14).

Figure 8:
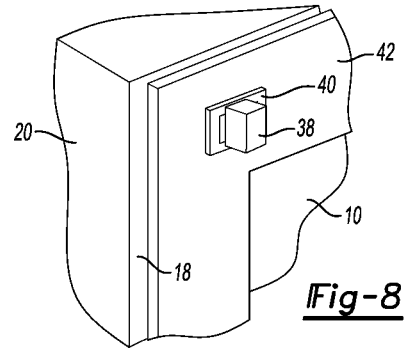
FIG. 8 is an assembled view of the fastener and impermeable layer shown in FIG. 7.

As further shown in the assembled view of the fastener and impermeable layer shown in FIG. 8, the end portion 38 is rotated to from the initial installation position of FIG. 7 and in order to engage the eyelet 40 and, by extension, the rigid surface of the frame portion 42 and thereby restrain the impermeable covering in place over the associated opening 22.

Figure 9:
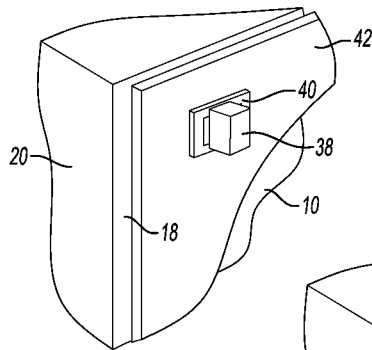
FIG. 9 is a related illustration to that shown in FIG. 8 in which impermeable layer is provided without an outer stiffening frame.

FIG. 9 is a related illustration to that shown in FIG. 8, in which a variation 44 of impermeable layer is itself reconfigured as a rigid (typically lightweight) panel, thus being provided without a separate outer stiffening frame as depicted in FIGS. 7 and 8. Otherwise, a similar twist and lock fastener configuration is provided for rigidly supporting the panel element 44 in place.

Figure 10:
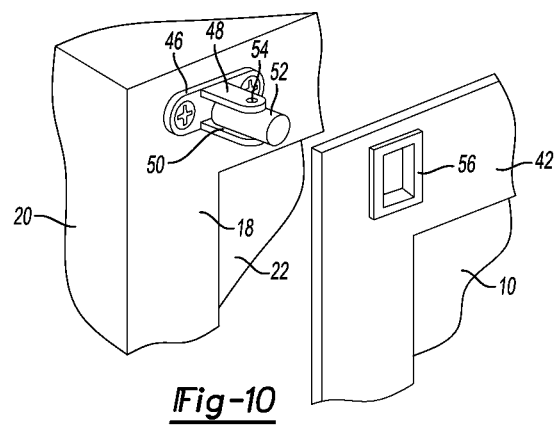
FIG. 10 is a partial exploded illustration of a rotate and lock fastener according to a related variant to that shown in each of FIGS. 5 and 7 in use with an impermeable layer exhibiting a perimeter extending and stiffening frame.
Figure 11:
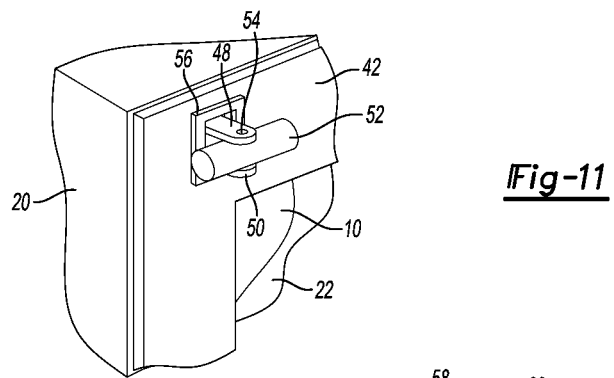
FIG. 11 is an assembled view of the fastener and impermeable layer shown in FIG. 10.

FIG. 10 is a partial exploded illustration of a rotate and lock fastener according to a related variant to that shown in each of FIGS. 5 and 7, again in use with an impermeable layer 10 exhibiting the perimeter extending and stiffening frame 42. A fastener secured base mounting portion 46 supports a pair of parallel spaced and projecting support plates 48 and 50, between which is pivotally supported a suitably dimensioned and cylindrical shaped twist and lock portion 52, via a pin 54 extending between proximate extending ends of the support plates 48 and 50. In contrast to the earlier variants of FIGS. 5 and 7, the twist and lock (cylindrical) portion 52 in the embodiment of FIG. 10 is mounted for rotation about a vertical axis and, as further shown in the assembled view of FIG. 11, the cylindrical portion 52 is rotated from the installation position of FIG. 10 upon seating there over a reconfigured rectangular eyelet 56 (as opposed to as shown at 40 in FIG. 8) mounted to the edge (rigid frame 42) of the impermeable layer 10.

Figure 12:
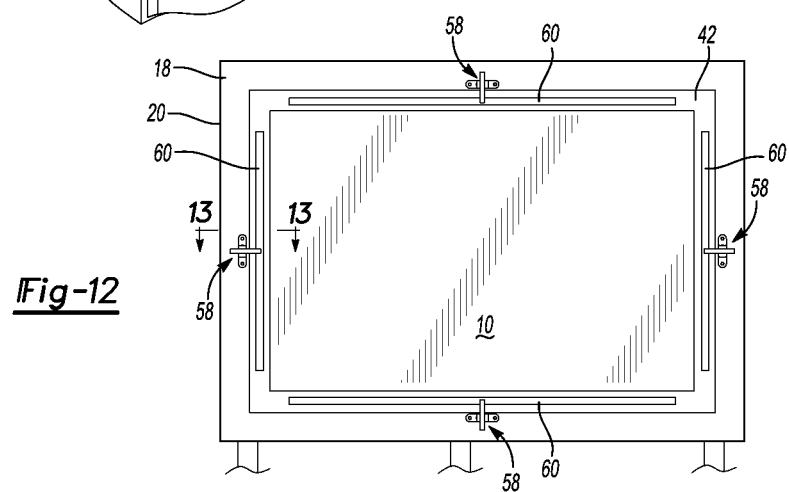
FIG. 12 is a planar illustration of a further variant in which a plurality of spring loaded clamps are utilized around a perimeter of the unit opening in order to grippingly engage a reinforced frame edge associated with the air impermeable layer.

Referring further to FIG. 12, is a planar illustration is provided of a further variant of mounting structure in the form of interconnecting side located and spring loaded clamps 58, associated with an impermeable layer 10 such as which further includes a perimeter/frame extending support as identified at 42 as well as optionally including additional lengthwise extending or stiffening supports 60. As shown, the spring loaded clamps 58 are utilized in either singular (as shown) or plural (not shown) fashion along each individual interconnected side and collectively around a perimeter of the unit opening in order to grippingly engage a selected and reinforced frame edge (also termed as a stiffened edge) associated with the air impermeable layer 10.

Figure 13:
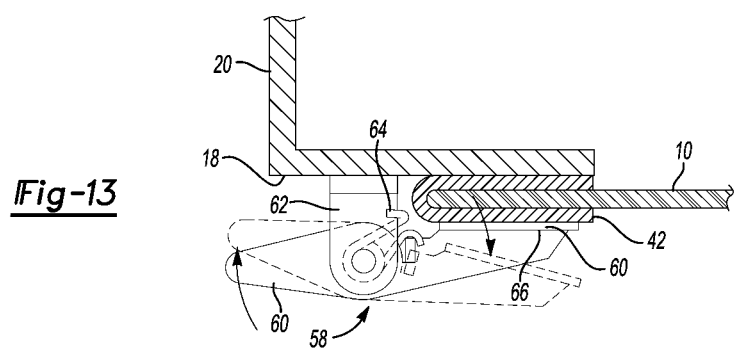
FIG. 13 is a sectional cutaway taken along line 12-12 of FIG. 12 and illustrating a selected clamp in spring-loaded and engaging fashion with a perimeter extending location of the impermeable layer.

As further depicted in FIG. 13, which is a sectional cutaway taken along line 12-12 of FIG. 12, a selected clamp 58 is generally illustrated in spring-loaded and engaging fashion with a perimeter extending location of the impermeable layer 10. An arm 60 of the clamp is pivotally supported to a base mounted and supporting portion 62 in biased fashion via an interposed clock spring 64, such that a surface engaging portion 66 of the clamp grips and biases against an opposing frame or perimeter 42 location (including optional additional stiffener 60) to securely mount in place the impermeable layer 10.

Figure 14:
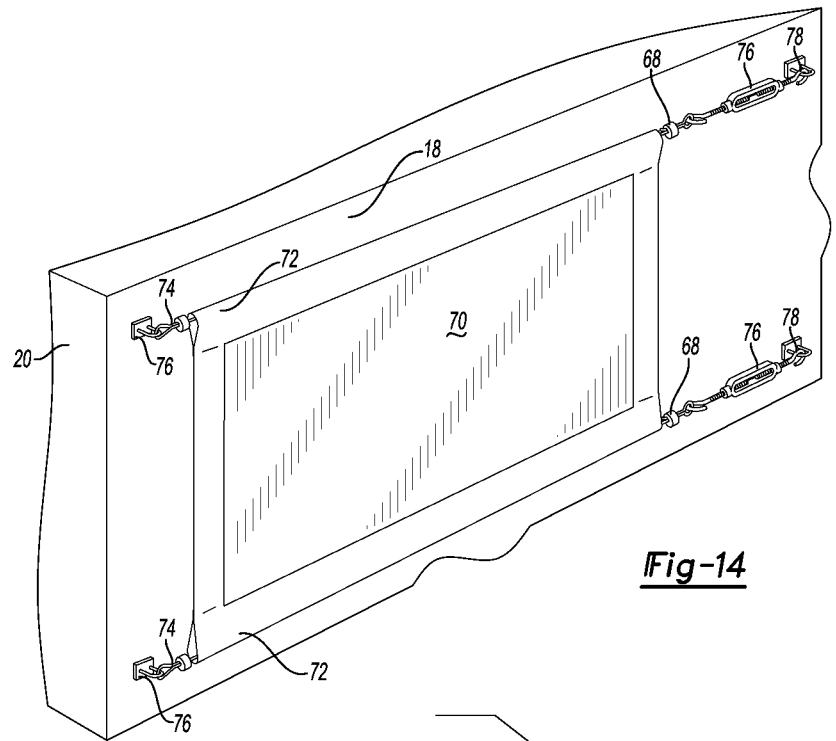
FIG. 14 is an illustration in perspective of a further variant in which first and second tensioning cables extend in spaced apart fashion for supporting a redesigned impermeable layer with edge extending looped portions over the unit opening.

FIG. 14 is an illustration in perspective of a further variant in which first and second tensioning cables 68 extending in spaced apart (horizontal as shown) fashion for supporting a redesigned impermeable layer 70 with opposite edge extending looped portions 72 over the unit opening. As shown, the cables 68 terminate at first ends in looped portions 74 each engage in fixed fashion via surface mounted eye bolts or the like (see further at 76). Opposite ends of the spaced apart pair of cables 68 can further include length adjustable turnbuckles 76 which in turn mount to additional unit surface mounted eyebolts 78 and in use insert through the extending looped ends 72 of impermeable layer 70 in order to support the same in either a loose hanging or (alternatively) a stretched configuration across the unit opening.

Although not further shown, it is understood and envisioned that the impermeable layer 70 can be clipped or otherwise secured to fixed locations of the cables 68 such that tensioning of the same via the turnbuckles 76 will cause the impermeable layer to stretch in additional sealing and protective fashion over the opening. It is also envisioned that the cables can be reconfigured to extending either alternatively or additionally in a vertical direction across the unit opening additional to that shown.

Figure 15:
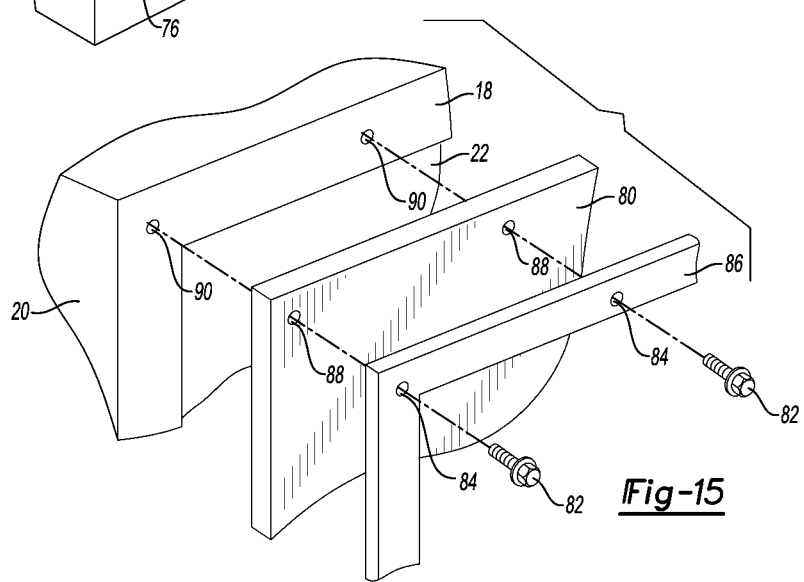
FIG. 15 is an exploded view of a plurality of bolt fasteners for mounting an impermeable layer and exteriorly positioned frame to a flush surface of the unit surrounding the perimeter opening.

FIG. 15 is an exploded view of a yet further variant of mounting architecture for securing a generally panel constructed impermeable layer (at 80) to a mounting surface 18 of the unit 20. In the illustrated embodiment, a plurality of bolt fasteners 82 are provided for mounting the impermeable layer 80 via a series of aligning apertures including those at 84 formed in an (optionally provided) outer frame 86, additional apertures 88 formed in the impermeable panel itself, and recessed (interiorly threaded) apertures 90 defined in the mounting face 18 of the unit 20. In this fashion, the fasteners 82 are employed to secure impermeable panel (or layer) 80 in a substantially flush mounting fashion to the surface 18 of the unit 20 surrounding the perimeter opening.

Figure 16:
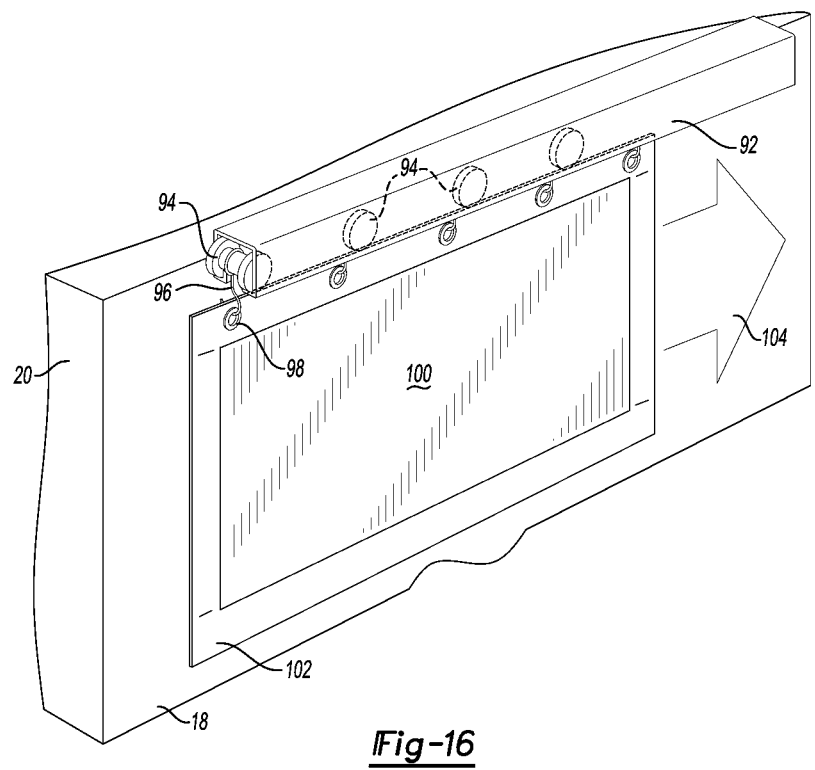
FIG. 16 is an illustration of a yet succeeding variant in which a horizontal and modified "U" shaped extending track is provided which contain a plurality of spindle shaped and traversable rollers with downwardly extending hooks for extending an impermeable layer across the unit opening.

Referring finally to FIG. 16, an illustration of a yet succeeding variant in which a horizontal and modified "U" shaped extending track 92 is secured in horizontally extending fashion along a top of the unit mounting surface 18, above the unit opening. The elongated track 92 is further configured such that it seats a plurality of individual spindle shaped and traversable rollers, see as shown at 94, each further exhibiting a downwardly extending hook 96 passing through a lower clearance slot or channel defined between the roller supporting sides of the track, the hooks 96 engaging selected eyelets 98 associated with an impermeable layer 100 (and including an outer reinforcing hem or perimeter 102) in a generally curtain supporting and translating fashion (see further arrow 104) across the unit opening. Although not shown, the track 92 can be provided in combination with other supporting and/or mounting structures (including but not limited to such as those previously described) for ensuring the lower curtain edges of the layer 100 maintaining position over the side and lower adjoining edges of the opening.

The impermeable (wind guard) layer is designed for use on such as dual circuit chillers and condenser units (these collectively and generally referenced as unit 20 herein) which are equipped with a "high head temperature" safety shut-off mechanism. Upon ambient temperatures rising to a point where the condenser or chiller can no longer reject enough heat to sustain normal operation, the wind guards (impermeable layers) can again be removed and stored (such as during warmer weather seasons).

An associated method of installing the impermeable covering material includes the steps of preparing or installing surface mounting fasteners along a face of the unit surrounding the coil accessible opening and affixing the impermeable layer in extending fashion over the unit opening. Additional steps include installing fasteners of modified size for accommodating an underlying layer of filtration (e.g. cottonwood filter screen) and over which the outer wind guard layer is installed in easily and separately removable fashion.

Having described my invention, other and additional preferred embodiments will become apparent to those skilled in the art to which it pertains, and without deviating from the scope of the appended claims. These can include reconfiguring the impermeable layer for use on cooling towers in order to prevent ice and snow build-up in the fill material of the evaporative cooling towers and evaporative condensers which can damage the "fill".

I claim:

1. A seasonal covering system, comprising:
an outdoor located unit defining an opening which exposes internal components;
a plurality of fasteners, each including a base portion with outwardly projecting supporting structure, said base portions being secured upon a face of the unit at a spaced apart location proximate to the opening;
said fasteners each further including a generally elongate and rounded edged component pivotally supported relative to said supporting structures about an axis defined by a widthwise inserting mounting pin such that said rounded edged components each extend outwardly a projected distance beyond said supporting structure; and
an air and precipitation impermeable layer of a flexible material arranged over the opening and which prevents at least one of air movement and/of precipitation through said opening in contact with the components, said impermeable layer further including a plurality of aperture defining eyelets arranged about a perimeter thereof and which are received over said elongate and rounded edged components arranged in first linear extending positions relative to said supporting structures, said elongate components subsequently rotating to assembled and retaining positions in which said air and/or precipitation impermeable layer is restrained by said rotated components and supported over said supporting structure against said base portions.

2. A seasonal covering system, comprising:
an outdoor located unit defining an opening which exposes internal components;
a generally "U" shaped extending track secured in horizontally extending fashion along a top of a face of the unit above the opening, a plurality of traversable rollers supported within said track and each further exhibiting a downwardly extending hook;
an air and precipitation impermeable layer of a flexible material arranged over the opening and including a plurality of aperture defining eyelets arranged about a perimeter thereof, a first top extending row of said eyelets being engaged by said hooks in order to suspend said impermeable layer from the top of the face over the opening; and
at least one additional plurality of fasteners arranged along additional extending sides of the unit face for engaging additional aligning rows of said eyelets in order to secure said air and precipitation impermeable layer along at least one additional side of the unit face and to prevent at least one of air movement and precipitation through the opening in contact with the internal components.

3. The covering system as described in claim 2, each of said rollers further comprising a spindle shape.

4. The covering system as described in claim 2, said at least one additional plurality of fasteners further comprising a plurality of thumb screw fasteners threadably mounted to associated stud adapters mounted in projecting fashion from the unit face.

5. The covering system as described in claim 2, said at least one additional plurality of fasteners further comprising a base portion secured to the face of the unit, a structural supporting portion extending outwardly a projected distance from said base portion and over which is seated said additional row of aligning eyelets associated with perimeter locations of said impermeable layer, and an end component which is mounted by a pin in at least one of rotating or pivoting fashion relative to the structural portion to restrain said layer, via said eyelets, upon said structural supporting portion.

6. The covering system as described in claim 5, said pivoting end component further comprising a generally elongate and rounded edged rotatable component.

7. The covering system as described in claim 5, said pivoting end component further comprising a cylindrical shape.

8. The covering system as described in claim 5, said end component further comprising a rotatable and rectangular shape for seating rectangular shaped eyelets associated with said impermeable layer.

9. The covering system as described in claim 2, said at least one additional plurality of fasteners each further comprising interconnecting side located and spring loaded clamps grippingly engaging selected stiffened edges associated with said impermeable layer.

10. The covering system as described in claim 9, said spring loaded clamps each further comprising an arm pivotally supported to a base mounted and supporting portion in biased fashion via an interposed clock spring, such that a surface engaging portion of said clamp grips and biases against said stiffened edges of said impermeable layer.

11. The covering system as described in claim 2, said at least one additional plurality of fasteners each further comprising first and second tensioning cables extending in spaced apart fashion for supporting an impermeable layer with opposite edge extending looped portions over the unit opening.

12. The covering system as described in claim 11, further comprising said cables terminating at first ends in looped portions engaging in fixed fashion via unit surface mounted eye bolts, opposite ends of said cables exhibiting length adjustable turnbuckles in turn mounting to additional unit surface mounted eyebolts.

13. A seasonal covering system, comprising:
an outdoor located unit defining an opening which exposes internal components;
an air and precipitation impermeable layer of a flexible material arranged over the opening and which prevents at least one of air movement and precipitation through said opening in contact with the components; and
a plurality of interconnecting side located and spring loaded clamps secured to each of a plurality of interconnecting sides defining a surrounding perimeter face of the unit, each of said clamps having an arm pivotally supported in biased fashion to a supporting portion secured to the unit via an interposed clock spring, said arm exhibiting an inwardly facing surface engaging portion grippingly engaging selected stiffened edges associated with said impermeable layer to restrain and support said layer over the opening.

14. A seasonal covering system, comprising:
an outdoor located unit defining an opening which exposes internal components;
an air and precipitation impermeable layer of a flexible material arranged over the opening and which prevents at least one of air movement and precipitation through said opening in contact with the components; and
a plurality of fasteners including at least first and second tensioning cables extending in spaced apart fashion for supporting said impermeable layer over the unit opening and by extending through opposite edge extending looped portions associated with said layer, said cables terminating at first ends in looped portions engaging in fixed fashion via unit surface mounted eye bolts, opposite ends of said cables exhibiting length adjustable hardware in turn mounting to additional unit surface mounted eyebolts to restrain and support said layer over the opening.

15. A seasonal covering system, comprising:

an outdoor located unit exhibiting a perimeter extending face within which is defined a multi-sided opening which exposes internal components of the unit;

at least two "U" shaped extending tracks secured to said perimeter extending face of the unit proximate selected sides of the opening, a plurality of traversable rollers supported within each of said tracks, and each further exhibiting a downwardly extending hook; and an air and precipitation impermeable layer of a flexible material arranged over the opening and including a plurality of aperture defining eyelets arranged about a perimeter thereof, said eyelets being engaged by said hooks in order to secure said impermeable layer to the perimeter extending face over the opening and to prevent at least one of air movement and precipitation through the opening in contact with the internal components.

* * * * *